Nov. 22, 1927. 1,650,476
C. WEILER
SAW
Filed May 6, 1926
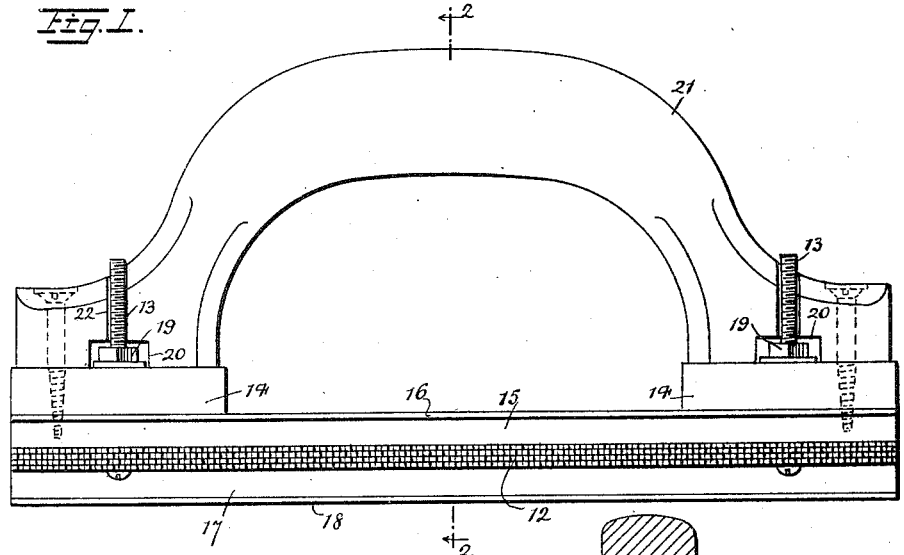
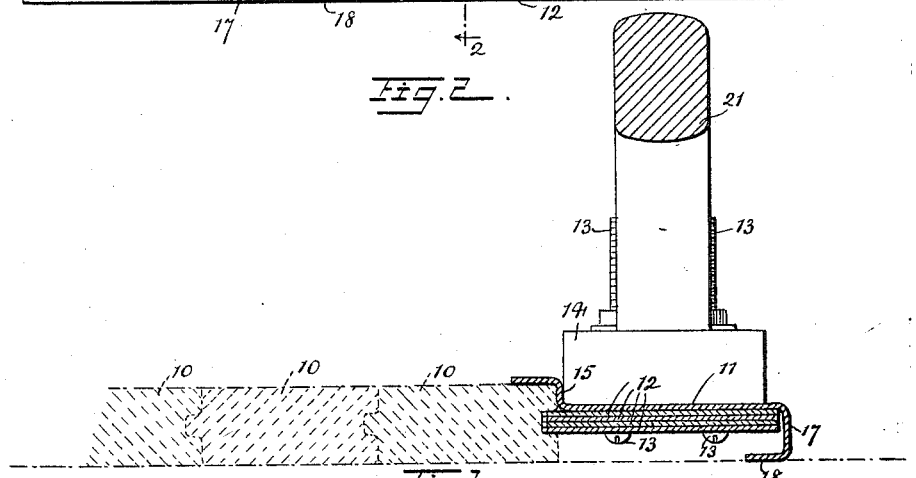
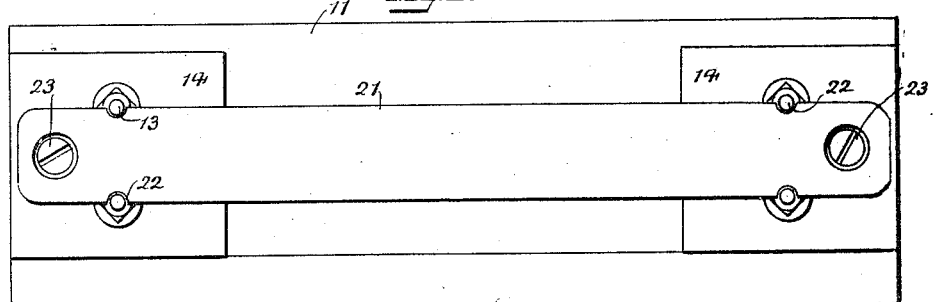
WITNESSES
H. J. Walker
Franklin J. Foster
INVENTOR
Charles Weiler.
BY
Munn & Co
ATTORNEYS Patented Nov. 22, 1927.

1,650,476

UNITED STATES PATENT OFFICE.

CHARLES WEILER, OF NEW YORK, N. Y.

SAW.

Application filed May 6, 1926. Serial No. 107,235.

The present invention is concerned with the provision of a saw for cutting grooves in the lateral edges of boards, and is peculiarly adapted for embodiment in a tool which may cut grooves in floor boards after the floor boards have been laid.

An object of the invention is to provide a tool of this character adapted for selectively cutting grooves of any width which will be of simple, practical construction, which will be rugged and durable in use, which may be readily manipulated, and which may be manufactured with comparative economy.

With the above noted and other objects in view, the invention consists in certain novel features of construction and combinations and arrangements of parts, as will be more fully hereinafter set forth and pointed out in the claims. The invention may be more fully understood from the following description in connection with the accompanying drawings, wherein—

Fig. 1 is a view in side elevation of a saw embodying the present invention.

Fig. 2 is a view in transverse section therethrough on the line 2—2 of Fig. 1, a series of floor boards being indicated in dotted lines.

Fig. 3 is a top plan view of the saw.

I have indicated in dotted lines in Fig. 2 a series of grooved and tenoned floor boards 10, the saw of the present invention being peculiarly suited for forming grooves in the boards which receive the tenons, although it may have a wide range of utility in the arts aside from the particular use illustrated. These boards are ordinarily formed with the tenons but without the grooves, and the grooves are made during the course of laying the boards. With the device of the present invention, a board may be laid and the grooves subsequently formed by the use of my improved saw.

The saw includes a backing plate 11, to the face of which are secured one or a plurality of saw blades 12 in accordance with the width of the groove which it is desired to cut in the floor board. As illustrated four saw blades are provided, these blades being arranged in superimposed relationship, and held in position by screws 13 passed through aligned openings in the blades and backing plate, and anchored in blocks 14 mounted on the backing plate.

The toothed edges of the saw blades are preferably arranged in lateral alignment, but the blades are out of longitudinal alignment in order that the teeth of the adjacent blades may be relatively staggered. At one side edge, the backing plate 11 is bent upwardly at 15 and laterally at 16 providing an offset gauge or rest which overlies the edge of the floor board 10. The other end of the plate 11 is bent downwardly at 17 and inwardly at 18 to define a flange which rests upon the floor. With the flange 18 resting on the floor, and the flange 16 resting on the edge of one of the floor boards 10, the saw may be manually reciprocated to groove the board 10 as seen in Fig. 2.

In order to accommodate for any suitable number of saw blades 12, the screws 13 preferably extend well above the blocks and are retained in place by nuts 19 accommodated in recesses 20 in the ends of a handle 21. These handle ends may also be notched at 22 to accommodate the upper ends of the screws 13, the handle itself being retained in place by screws 23 passed downwardly into the blocks 14.

From the foregoing construction it will be apparent that the device may be used either with a single blade of any desired thickness, or with a plurality of superimposed blades, the screws 13 and nuts 19 being readily adjustable to accommodate varying thicknesses of saw blades.

In use, the tenon of a floor board is inserted in the groove of an adjacent floor board, and a groove may then be produced in the floor board just inserted. The backing plates with their flanges 18 and rests 16 may be made in standard sizes to accommodate standard thicknesses of floor boards, and there is no difficulty involved in properly supporting and gauging the saw for a grooving operation. Flange 16 extends laterally a sufficient distance beyond the toothed edges of the saw blades, so that it will rest upon the saw board at the initiation of a sawing operation. The vertical portion 15 of the plate 11 gauges the depth of the groove.

Various changes and alterations might be made in the general form and arrangement of parts described without departing from the invention. Hence I do not wish to limit myself to the details set forth, but shall consider myself at liberty to make such changes and alterations as fairly fall within the spirit and scope of the appended claims.

I claim:

1. A saw of the class described including a backing plate, a handle thereon, a saw blade secured against the under face of the backing plate, and guide flanges rigid with opposite edges of the backing plate and adapted to rest upon a piece of work being sawed and a support for the work respectively, the work engaging flange being offset relatively to the backing plate and extending laterally beyond the teeth of the saw blade.

2. A saw of the class described including a backing plate, a handle thereon, a saw blade secured against the under face of the backing plate, and guide flanges rigid with opposite edges of the backing plate and adapted to rest upon a piece of work being sawed and a support for the work respectively, the support engaging flange being offset from the backing plate, and extending inwardly to define with the backing plate a channel receiving the untoothed edge of the blade.

CHARLES WEILER.